United States Patent
Reusch et al.

(10) Patent No.: US 10,287,985 B2
(45) Date of Patent: May 14, 2019

(54) RETAINER FOR AT LEAST PARTIALLY ANNULAR GAS SUPPLY LINES OF A STATIONARY GAS TURBINE

(71) Applicant: Siemens Aktiengesellschaft, Munich (DE)

(72) Inventors: Ralf Reusch, Mülheim an der Ruhr (DE); Ruiqian Fei, Essen (DE); Werner Hesse, Haltern am See (DE); Daniel Murrenhoff, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 15/100,874

(22) PCT Filed: Dec. 3, 2014

(86) PCT No.: PCT/EP2014/076386
§ 371 (c)(1),
(2) Date: Jun. 1, 2016

(87) PCT Pub. No.: WO2015/086393
PCT Pub. Date: Jun. 18, 2015

(65) Prior Publication Data
US 2016/0305326 A1  Oct. 20, 2016

(30) Foreign Application Priority Data
Dec. 9, 2013 (EP) ..................... 13196196

(51) Int. Cl.
*F02C 7/20* (2006.01)
*F01D 25/28* (2006.01)
*F02C 7/22* (2006.01)
*F01D 25/24* (2006.01)

(52) U.S. Cl.
CPC ............... *F02C 7/20* (2013.01); *F01D 25/24* (2013.01); *F01D 25/28* (2013.01); *F02C 7/222* (2013.01);
(Continued)

(58) Field of Classification Search
CPC .... F02C 7/20; F02C 7/22; F02C 7/222; F23R 3/60; F05D 2260/30
See application file for complete search history.

(56) References Cited

U.S. PATENT DOCUMENTS 5,271,218 A * 12/1993 Taylor ..................... F02C 7/222
60/739
5,369,952 A * 12/1994 Walters .................. F02C 7/222
188/381
(Continued)

FOREIGN PATENT DOCUMENTS

CN    101377134 A    3/2009
EP    1719888 A2    11/2006
(Continued)

OTHER PUBLICATIONS

JP Notice of Allowance dated Jun. 26, 2017, for JP patent application No. 2016537553.
(Continued)

*Primary Examiner* — Gerald L Sung
*Assistant Examiner* — Christopher M Adams
(74) *Attorney, Agent, or Firm* — Beusse Wolter Sanks & Maire

(57) ABSTRACT

A stationary gas turbine having at least one at least partially annular gas supply line, which is supported by a retainer, wherein the gas turbine has in the interior thereof a main flow direction of the working fluids, and wherein the retainer has at least one floor retainer supported against the floor and a face retainer attached to the housing of the gas turbine on
(Continued)

the side opposite the floor retainer, and wherein both the floor retainer and the face retainer support the gas supply line against motion both in the main flow direction and perpendicularly thereto, wherein the face retainer has a spring system, which in particular compensates the change in the extent of the housing during operation of the gas turbine.

20 Claims, 2 Drawing Sheets

(52) U.S. Cl.
CPC ...... *F05D 2220/32* (2013.01); *F05D 2260/30* (2013.01)

(56) References Cited

U.S. PATENT DOCUMENTS

| | | | |
|---|---|---|---|
| 5,447,025 A | 9/1995 | Rousselle | |
| 5,540,547 A | 7/1996 | Cole | |
| 6,189,321 B1 * | 2/2001 | Banhardt | F02C 7/222 60/39.281 |
| 2002/0069647 A1 * | 6/2002 | Mayersky | F02C 7/222 60/796 |
| 2007/0033940 A1 | 2/2007 | Duverneuil et al. | |
| 2011/0000222 A1 | 1/2011 | Black et al. | |
| 2014/0013768 A1 * | 1/2014 | Laing | F02C 7/20 60/796 |

FOREIGN PATENT DOCUMENTS

| | | |
|---|---|---|
| EP | 1736651 A2 | 12/2006 |
| JP | H06341303 A | 12/1994 |
| JP | 2006307851 A | 11/2006 |

OTHER PUBLICATIONS

CN Office Action dated Nov. 21, 2016, for CN patent application No. 201480067493.9.

* cited by examiner

RETAINER FOR AT LEAST PARTIALLY ANNULAR GAS SUPPLY LINES OF A STATIONARY GAS TURBINE

CROSS REFERENCE TO RELATED APPLICATIONS

This application is the US National Stage of International Application No. PCT/EP2014/076386 filed Dec. 3, 2014, and claims the benefit thereof. The International Application claims the benefit of European Application No. EP13196196 filed Dec. 9, 2013. All of the applications are incorporated by reference herein in their entirety.

FIELD OF INVENTION

The present invention relates to a stationary gas turbine having at least one at least partially annular gas supply line which is supported and retained by a retainer.

BACKGROUND OF INVENTION

Until now, the typically annular gas supply lines of stationary gas turbines have been fastened to the housing of the gas turbine by way of suitable retainers. Such a retainer is described in EP 1736651A2, for example. By virtue of the requirements pertaining to the stability of the fastening, comparatively large retainer components are in most cases attached to the external side of the housing of the gas turbine. However, since the construction of a gas turbine is becoming increasingly complex, further important functional components are at times fastened to the external side of the housing, or the housing is shaped in such a manner that ready retaining of the gas supply line is no longer possible, respectively. Here, the guide vane adjustment installations which in the case of more recent gas turbines occupy a large part of the external face of the housing are to be mentioned in particular. As a result, such functional components prevent conventional fastening of the gas supply line to the external side of the housing of the gas turbine.

However, the retainers to date have proven disadvantageous for attachment to the external side of the housing of the gas turbine not only by virtue of the potentially reduced space but also in terms of the stability requirements which have to be met for example when an earthquake arises. The legal safety requirements specifically demand that the gas supply lines are capable of being retained on the gas turbine in a secure manner and without suffering damage even in the case of an earthquake. However, fixed retainers which are connected to the external side of the housing in the case of an earthquake at times transmit mechanical vibrations to the gas supply line in such an efficient manner that the latter may be damaged or even ruptured, respectively. However, in such a significant case of damage, the outbreak of a fire would have to be taken into account, this having to be avoided.

In order for the gas supply lines to be decoupled from the external side of the housing of the gas turbine, U.S. Pat. No. 5,271,218 proposes to rigidly fix a gas supply line on two lateral stands which are incorporated in a foundation to in each case two fastening points. However, the effects of mechanical vibrations are again not adequately considered here such that mechanical damage has to be taken into account when such vibrations arise in particular on the fastening points of the stands. Adequate earthquake-proofing cannot at all be guaranteed in this way.

By virtue of the disadvantages of the prior art that have been illustrated above, the technical requirement of proposing an improved retainer for an at least partially annular gas supply line arises, so as to attach the latter both in an efficient manner in terms of space utilization as well as in a secure manner to the housing of the stationary gas turbine. Furthermore, the gas supply line is also intended to be capable of being safely operated in the case of mechanical shocks and vibrations acting thereon such that improved earthquake-proofing may also be guaranteed, for instance.

To the extent of there not being any mention to the contrary, the attachment of the retainer to the housing of the gas turbine here primarily relates to the external side of the gas turbine.

SUMMARY OF INVENTION

An object on which the invention is based is achieved by a stationary gas turbine as claimed.

These objects on which the invention is based are in particular achieved by a stationary gas turbine having at least one at least partially annular gas supply line which is supported by a retainer, wherein the gas turbine in the interior has a main flow direction of the operating fluids, and wherein the retainer comprises at least one floor retainer which is supported in relation to the floor, and an end face retainer which is attached to the housing of the gas turbine on that side that is opposite the floor retainer, and wherein both the floor retainer as well as the end face retainer support the at least one gas supply line in relation to both movement in the main flow direction as well as perpendicular to the latter, wherein the end face retainer has a spring system which compensates particularly the variation in the expansion of the housing during operation of the gas turbine.

It is to be pointed out here that the main flow direction of the operating fluids corresponds to the mean main flow direction of the operating fluids and in the normal case is congruent with the longitudinal axis of the gas turbine. The main flow direction corresponds in particular to the axis of longitudinal extent of the gas turbine rotor. Moreover, it is to be pointed out that a support in relation to a movement in the main flow direction is also to comprise a support in the direction counter thereto.

It is to be furthermore pointed out that an at least partially annular gas supply line is to have at least one portion which is configured to be substantially annular. However, annularity is already achieved when the former may be described even only in an approximate manner by way of a polygonal train. To this extent it is thus not required by default in the context of the invention that the gas supply line describes a mathematically precise annular shape or such portions, respectively. Rather, it suffices for the respective overall shape of the portion to be capable of being potentially replaced by an annular portion.

The retainer concept according to the invention proposes that retaining the at least partially annular gas supply line is guaranteed on at least two sides of the housing of the gas turbine, wherein the two sides are substantially mutually opposite. By virtue of the geometric arrangement of the floor retainer and the end face retainer it may be guaranteed, on the one hand, that the dead weight of the gas supply line is efficiently supported wherein a support in relation to a movement in the main flow direction may be simultaneously achieved in an efficient manner. At the same time, mechanical effects in the form of vibrations, for instance, may be damped in an improved manner, specifically in that the retainer regions (floor retainer and end face retainer) are substantially mutually opposite and the vibration amplitudes which are launched thereinto may thus be effectively reduced. Furthermore, the floor retainer is supported in relation to the floor such that not only efficient support of forces but also advantageous damping of vibrations may be achieved on account thereof. Moreover, since the support is not only directed toward the floor, that is to say approximately perpendicularly to the main flow direction, but also in relation to a movement in the main flow direction, or in the direction counter to the main flow direction, respectively, good damping of vibration amplitudes which are launched into the system of the gas turbine and the gas supply line may be achieved.

It is furthermore provided according to the invention that the end face retainer has a spring system which may compensate particularly the variation in the expansion of the housing during operation of the gas turbine. Mechanical shocks and effects of vibrations may likewise be damped therewith such that improved earthquake-proofing may be guaranteed, for instance. The spring system here may be set to provide particularly effective vibration damping in relation to the spring characteristic of the gas supply line. Springs of a specific spring hardness may be provided in particular to this end, wherein a static or dynamic computation in terms of the vibration engineering may ensure that the natural vibrations of the system are particularly well damped.

According to one embodiment of the invention, the end face retainer in the case of regular operation of the gas turbine is provided on the apex of the housing. However, it is likewise possible for the end face retainer to be attached in a position which deviates therefrom, that is to say so as to be laterally displaced on the housing face in the direction toward the floor retainer. However, it is essential here that the end face retainer in the cross-sectional view through the housing of the gas turbine is attached in relation to the upper housing part (upper housing portion), whereas the floor retainer is assigned to the lower housing part, that is to say faces the floor. However, a corresponding assignment here does not require attachment to the housing of the gas turbine. Most particularly, no attachment of the floor retainer to the housing of the gas turbine is performed in order to achieve mechanical decoupling between the retainer and the gas turbine.

According to one further embodiment of the invention, it is provided that the floor retainer is not connected to the housing of the gas turbine and is in particular anchored in a foundation of the gas turbine. On account thereof and as has been mentioned above, decoupling between the floor retainer and the gas turbine may be achieved, on the one hand, and efficient support of the weight of the gas supply line and of the service lines connected thereto may also be guaranteed, on the other hand. According to the embodiment, the floor retainer may have individual retainer portions which at least partially surround the gas supply line in the circumferential direction thereof (when viewed in cross section in the radial direction, or in cross section perpendicularly to the flow direction in the gas supply line, respectively). The retainer portions here may be embodied such that individual gas supply lines in the retainer may be fastened or released individually, respectively.

According to one further embodiment of the invention, it is provided that the end face retainer has a first connection region which is fixedly connected to the housing of the gas turbine, as well as a second connection region which is supported in relation to the housing of the gas turbine but is not fixedly connected thereto. To this extent the end face retainer may also compensate variations in the geometry of the housing of the gas turbine such as during operation of the gas turbine at very high temperatures. In particular, no stresses between the housing of the gas turbine and the end face retainer which may lead to stress damage, such as stress fissures, result. Moreover, efficient damping may be achieved at times when vibrations are launched into the system of the gas turbine and the gas supply line, specifically in that movement of the end face retainer against the housing of the gas turbine may also contribute toward damping of the vibration damping. In particular, the second connection region of the end face retainer is displaceable in relation to the surface of the housing of the gas turbine.

According to a likewise embodiment of the invention, it is provided that the retainer furthermore has at least two lateral retainers which each support the gas supply line on mutually opposite sides of the gas turbine, in particular proving support only in relation to movement in the main flow direction. Here, the lateral retainers advantageously achieve support of the gas supply line at a height of the gas turbine which is disposed so as to be substantially centric between the end face retainer and the floor retainer. The lateral retainers here serve for furthermore improved support of the gas supply line, in particular in relation to a movement in the main flow direction and perpendicular thereto. By way of the lateral retainers on the one hand weight forces of the gas supply line or of the service lines connected thereto, respectively, may in turn be supported; moreover, however, vibration damping of the gas supply line, in particular upon movement in or counter to the main flow direction, may be achieved in a particularly efficient manner.

According to one embodiment, it is provided here that the at least two lateral retainers are not connected to the housing of the gas turbine and are in particular supported in relation to the floor and are advantageously anchored in a foundation of the gas turbine. In this way, the two lateral retainers in a manner comparable to the floor retainer, may be decoupled from the housing of the gas turbine, on the one hand, and thus achieve particularly effective damping in the case of vibrations; on the other hand, no technical precautions need to be made when the gas turbine during operation is thermally expanded or contracted, respectively, as a result of temperature variations, for instance. The fixed anchoring of the two lateral retainers in the foundation of the gas turbine here moreover guarantees earthquake-proofing during operation.

According to one alternative embodiment or a supplementary embodiment, respectively, it may be provided that the at least two lateral retainers do not completely encompass gas supply lines but in particular support the gas supply line in only two mutually opposite regions which are not interconnected. Here, the two mutually opposite regions in particular serve as supports upon movement in the direction of the main flow direction or in the direction counter thereto, respectively. On account thereof, targeted and directionally oriented vibration damping may be performed, for instance, without having to accept the risk of damaging the gas supply line by virtue of an all-encompassing retainer, for instance in the case of an earthquake.

According to a likewise embodiment of the invention, it is provided that at least two at least partially annular gas supply lines, in particular precisely two or four gas supply lines, are provided. By providing a plurality of gas supply lines the flexibility of providing the gas turbine with fuel may thus be improved. Likewise, serviceability is improved on account thereof, since individual gas supply lines may be individually serviced, removed or replaced, respectively. By virtue of the experience of the applicant it has been demonstrated to be advantageous to provide two or four gas supply lines, since the latter at times may hold ready fuel at dissimilar pressures, which may be made available at dissimilar operating time points. According to one further embodiment of the invention, it is provided that the at least one gas supply line and the retainer are provided in a region of the housing of the gas turbine that has no guide vane adjustment installation. It may thus be guaranteed that the gas supply line or retainer, respectively, and the guide vane adjustment installation do not influence one another in an undesirable manner. Providing a gas supply line and a retainer here refers to the geometric arrangement of the gas supply line and the retainer on the housing of the gas turbine or above the surface of the housing, respectively. According to the embodiment it is thus conceivable that the housing of the gas turbine has a guide vane adjustment installation which is disposed at a maximum height above the housing, or protrudes therefrom, respectively, the at least one gas supply line however being fixed yet above this maximum height of the retainer.

The invention is to be discussed in more detail hereunder by means of individual figures. It is to be added here that the figures are to be considered as merely schematic and do not permit any limitation in terms of the implementability of the invention.

It is furthermore to be pointed out that all components having identical reference signs have a comparable technical effect.

It is likewise to be pointed out that the technical features illustrated hereunder are to be claimed in any mutual combination, to the extent that the combination is capable of achieving the object on which the invention is based.

DETAILED DESCRIPTION OF INVENTION

Figure 1:
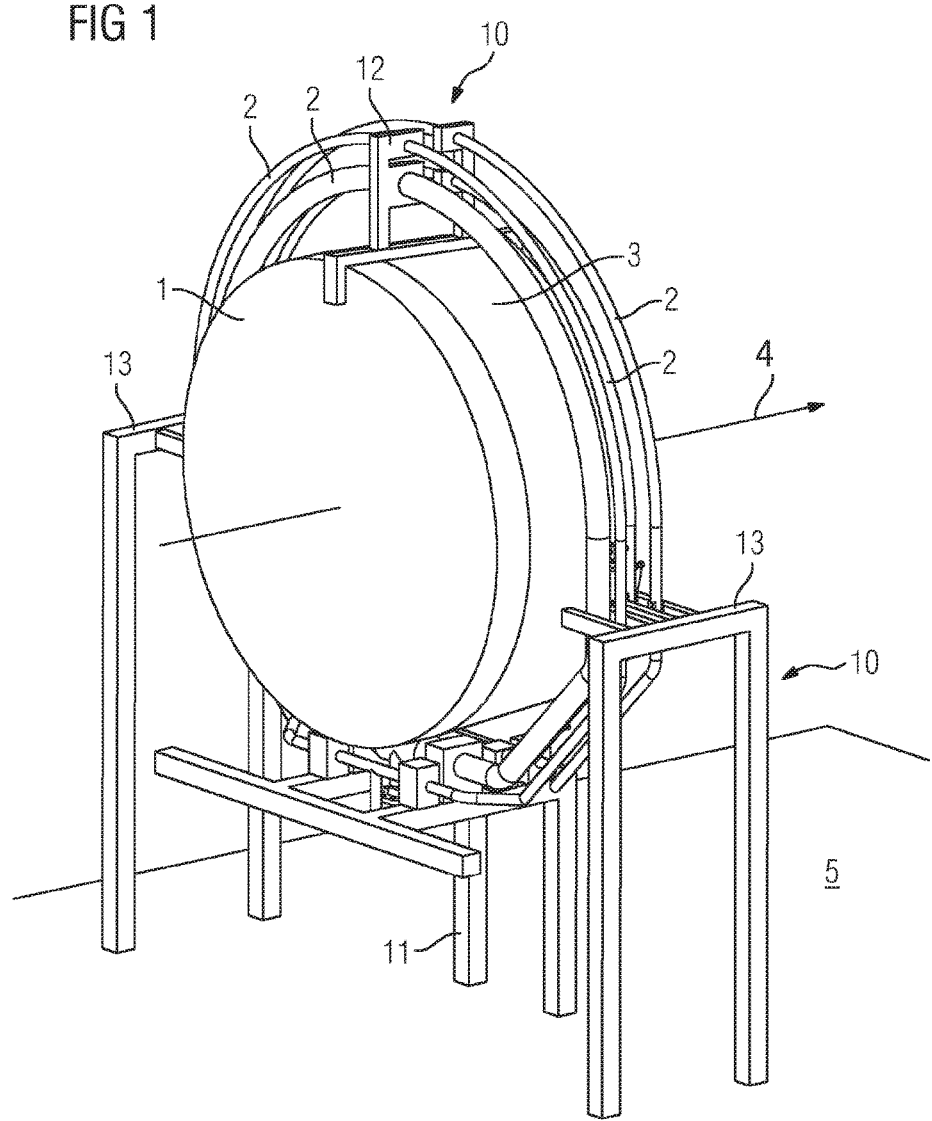
FIG. 1 shows a perspective side view of an embodiment of the stationary gas turbine according to the invention, having a retainer.

FIG. 1 shows a perspective view from the side onto an embodiment of the stationary gas turbine 1 according to the invention, which has a retainer 10 which is provided for retaining an at least partially annular gas supply line 2. The gas supply line 2 has a total of four individual lines which encircle or surround the external face of the housing 3 in a substantially annular manner in the circumferential direction.

The individual lines of the gas supply line 2 here are retained or supported, respectively, by a floor retainer 11, an end face retainer 12, as well as by two lateral retainers 13.

During regular operation of the gas turbine 1, the end face retainer 12, as is presently illustrated, is attached to the apex of the external face of the housing 3. The end face retainer 12 here has individual retainer portions for the individual lines of the gas supply line 2, said retainer portions supporting both the dead weight of these individual lines in a manner perpendicular to a main flow direction 4 of the gas turbine 1, as well as in a manner perpendicular thereto, that is to say in the direction of the main flow direction 4 or in the direction counter thereto, respectively. The main flow direction 4 here relates to that direction of the operating fluids in the gas turbine 1 that during regular operation results as a mean direction across the entire geometry of the gas turbine 1. In the normal case, this main flow direction 4 corresponds to the longitudinal direction of extent of the gas turbine rotor (presently not shown), as is also presently the case. Furthermore, the end face retainer 12 has a spring system 15 (presently also not explicitly shown) which may in particular compensate the variation in the expansion of the housing 3 during operation of the gas turbine 1.

The floor retainer 11 is disposed on a side of the gas turbine 1 that is opposite the end face retainer 12. Since the floor retainer 11 is not mechanically connected in a direct manner to the housing of the gas turbine 1, said floor retainer 11 is particularly well decoupled from said housing in terms of vibrations. A connection between the floor retainer 11 and the gas turbine 1 is performed only by mediation by the individual lines of the gas supply line 2. The floor retainer 11 may effect support of the dead weight of the individual lines of the gas supply line 2 in relation to the floor, as well as support in relation to a movement in the direction of the main flow direction 4 or in the direction counter thereto, respectively. In order to nevertheless be able to guarantee secure positioning of the floor retainer 11 in relation to the gas turbine 1, the floor retainer 11 is anchored in a foundation 5 in which the gas turbine 1 is likewise anchored (presently not shown). Like the end face retainer 12, the floor retainer 11 has individual retainer portions for the individual lines of the gas supply line 2, providing encompassing of the entire circumference of these individual lines. On account thereof, secure retention as well as good support in further spatial directions may be achieved.

The substantial advantages of the floor retainer 11 can be seen in receiving and supporting the dead weight of the individual lines of the gas supply line 2, as well as, associated thereto, in receiving and supporting connected loads of the service lines (presently not shown). At the same time, individual lines of the gas supply line 2 may be fixed by suitable retainer portions such that no movement perpendicular to the main flow direction 4 may be performed. Moreover, the floor retainer 11 has fixed anchoring in the foundation 5, on account of which fixation in relation to the gas turbine 1 which is likewise fixed to the foundation 5 may be achieved.

Moreover, the retainer 10 has two lateral retainers 13 which are configured like the floor retainer 11 in the shape of stands. Here, the lateral retainers 13 are provided with retainer portions which support the individual lines of the gas supply line 2 at a height which is provided so as to be approximately centric between the attachment height of the end face retainer 12 and that of the floor retainer 11. Here, the retainer portions may again encompass the individual lines of the gas supply line 2 across the entire circumference so as to be able to achieve restriction of movement of the individual lines in two spatial directions. However, it is also possible that the retainer portions enable support only in two mutually opposite regions, which in particular may prevent movement of the individual lines of the gas supply lines in the main flow direction 4 and in the direction counter thereto, that is to say may achieve support in relation to these movements.

The two lateral retainers 13 thus allow the additional provision of support regions which in particular achieve directionally dependent guiding and thus a guarantee of additional stability. On account of the specific embodiment of the two lateral retainers 13, the thermal expansion of the gas supply line 2 during operation of the gas turbine may take place without causing damaging stresses in the components.

Figure 2:
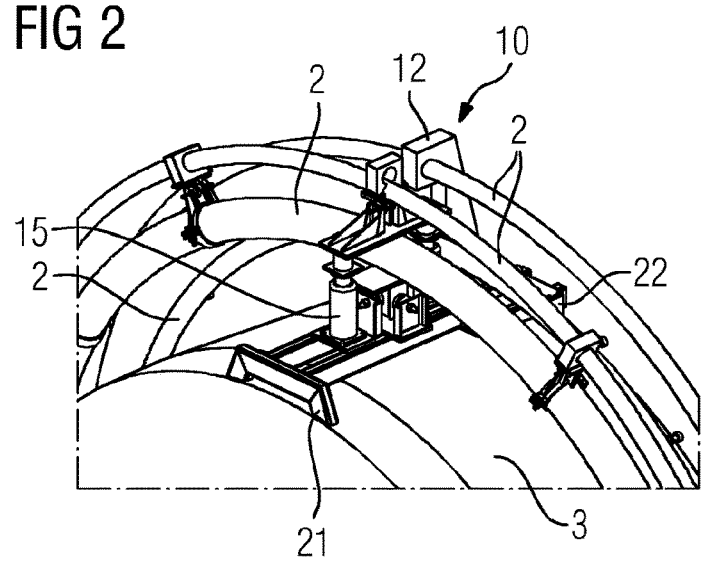
FIG. 2 shows a perspective detailed view of an embodiment of the end face retainer.

FIG. 2 shows a perspective detailed view of a further embodiment of an end retainer 12, in which it can be clearly seen that the individual lines of the gas supply line 2 are each retained in a separate manner. Moreover, the end face retainer 12 has a spring system 15 which in particular may compensate the variation in the expansion of the housing 3 during operation of the gas turbine 1. Moreover, a first connection region 21 which is fixedly connected to the housing 3 of the gas turbine 1, and a second connection region 22 which is supported in relation to the housing 3 of the gas turbine but is not fixedly connected thereto are provided. In this way, stress damage in the case of temperature variations may be avoided, since the end face retainer 12 is fixedly connected to the housing 3 of the gas turbine 1 only in one connection region, the other however allowing mutual displacement of the components.

The advantage of the end face retainer 12 primarily lies in guaranteeing secure retention even in the event of an earthquake. Moreover, the end face retainer 12 enables support of the gas supply line 2 in the direction of the floor, in order for the dead weight to be received, as well as in the direction of movement perpendicular thereto, for instance in the main flow direction 4. If the end face retainer 12 is of modular construction, as is shown, the individual lines of the gas supply line 2 may be readily removed and replaced. Equalization of the thermal expansion during operation of the gas turbine 1 may be achieved in an efficient manner by virtue of the embodiments of the end face retainer by means of a spring system 15 as well as by the only fixed connection to the housing being by way of the first connection region 21.

According to the embodiment, it is also possible for the end face retainer 12 to be embodied as a slide (presently not shown) such that a slide runner which retains the individual lines of the gas supply line 2 and which on such a slide may be displaced in a particular direction, in particular in the direction of the main flow direction 4, or perpendicular thereto, respectively.

Figure 3:
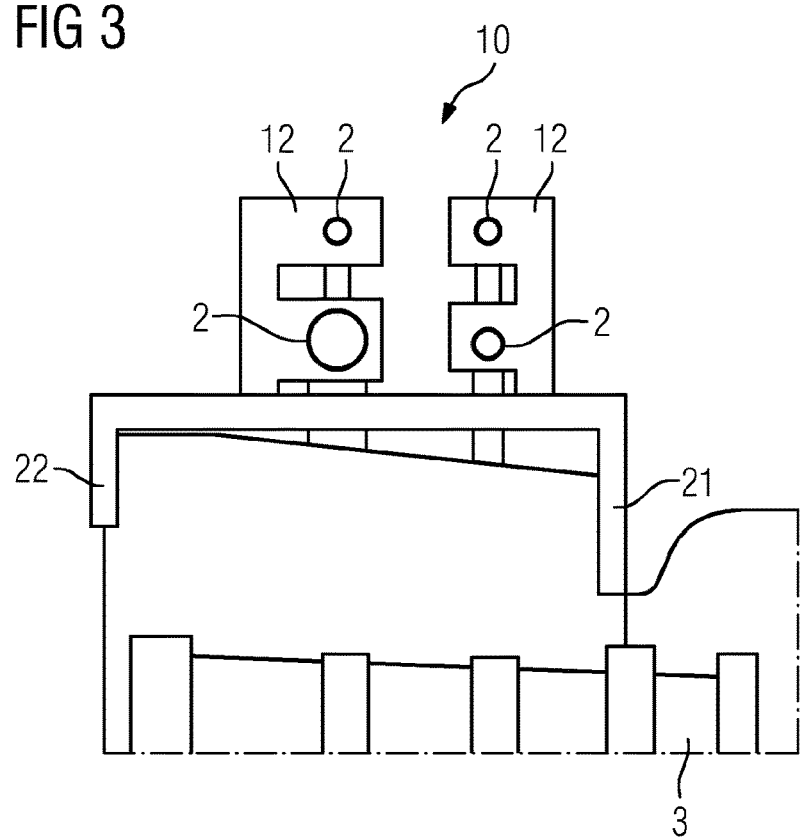
FIG. 3 shows a sectional view through an embodiment of the end face retainer shown in FIG. 1.

FIG. 3 shows a cross-sectional view through an embodiment of the end face retainer 12 such as shown in FIG. 1, for example. Here, it can be clearly seen in particular that the end face retainer 12 is disposed at a height which is disposed above the maximum height of a guide vane adjustment installation. To this extent, it is guaranteed that retention of the gas supply line 2 may be achieved in a secure and advantageous manner even when the retainer 10 is provided on a portion of the housing of the gas turbine 1 that also has a guide vane adjustment installation. The end face retainer (12) furthermore also has a spring system (15) (presently not explicitly shown) which in particular may compensate the variation in the expansion of the housing (3) during operation of the gas turbine (1).

Further embodiments are derived from the dependent claims.

The invention claimed is:

1. A stationary gas turbine having
at least one at least partially annular gas supply line which is supported by a retainer,
wherein the gas turbine in an interior of the at least one at least partially annular gas supply line comprises a main flow direction of operating fluids,
wherein the retainer comprises at least one floor retainer which is supported in relation to a floor and is not attached to a housing of the gas turbine, and an end face retainer which is attached to the housing of the gas turbine on that side that is opposite the at least one floor retainer, and wherein both the at least one floor retainer as well as the end face retainer support the at least one at least partially annular gas supply line in relation to both movement in the main flow direction as well as perpendicular to the main flow direction,
wherein the end face retainer in regular operation of the gas turbine is provided on an apex of the housing and comprises a spring system which compensates for expansion of the housing during operation of the gas turbine,
wherein the retainer further comprises at least two lateral retainers which each support the at least one at least partially annular gas supply line on mutually opposite sides of the gas turbine, and
wherein the at least two lateral retainers provide support only in relation to movement in the main flow direction.

2. A stationary gas turbine, comprising:
an at least partially annular gas supply line surrounding the gas turbine;
a floor retainer disposed on a floor and under the at least partially annular gas supply line, secured to the at least partially annular gas supply line, and configured to transmit a portion of a dead weight of the at least partially annular gas supply line directly to the floor; and
an end face retainer secured to a top of a housing of the gas turbine, secured to a top of the at least partially annular gas supply line, and configured to transmit a remainder of the dead weight of the at least partially annular gas supply line directly to the housing;
wherein the end face retainer comprises a spring system configured to compensate for expansion of the housing of the gas turbine during operation.

3. The stationary gas turbine of claim 2, wherein the floor retainer and the end face retainer also constrain the at least partially annular gas supply line from movement in a main flow direction of operating fluids in the gas turbine.

4. The stationary gas turbine of claim 2, further comprising at least two lateral retainers, each disposed on an opposite side of the at least partially annular gas supply line between the floor retainer and the end face retainer, and each configured to provide support only in relation to movement in the main flow direction.

5. The stationary gas turbine of claim 2, wherein the floor retainer is disposed under the gas turbine.

6. The stationary gas turbine of claim 2, wherein the floor retainer and the end face retainer are positioned at six o'clock and twelve o'clock respectively.

7. A stationary gas turbine, comprising:
at least one at least partially annular gas supply line which is supported by a retainer,
wherein the gas turbine in an interior of the at least one at least partially annular gas supply line defines a main flow direction of operating fluids,
wherein the retainer comprises: at least one floor retainer which is supported by a floor, disposed under a bottom of the at least one at least partially annular gas supply line, attached to the at least one at least partially annular gas supply line, and which is not attached to a housing of the gas turbine; and an end face retainer which is attached to the housing of the gas turbine on a side that is opposite the at least one floor retainer, and wherein both the at least one floor retainer as well as the end face retainer support the at least one at least partially annular gas supply line in relation to both movement in the main flow direction as well as perpendicular to the main flow direction, and wherein the end face retainer in regular operation of the gas turbine is provided on an apex of the housing and comprises a spring system which compensates for a variation an expansion of the housing during operation of the gas turbine.

8. The gas turbine as claimed in claim 7, wherein the end face retainer comprises a first connection region which is fixedly connected to the housing of the gas turbine, as well as a second connection region which is supported by the housing of the gas turbine but is not fixedly connected to the housing.

9. The gas turbine as claimed in claim 7, wherein the at least one at least partially annular gas supply line and the retainer are provided in a region of the housing of the gas turbine that comprises no guide vane adjustment installation.

10. The gas turbine as claimed in 7, wherein only the at least one floor retainer and the end face retainer support a dead weight of the at least one at least partially annular gas supply line.

11. The gas turbine as claimed in claim 7, wherein the at least one floor retainer is not connected to the housing of the gas turbine.

12. The gas turbine as claimed in claim 11, wherein the at least one floor retainer is anchored in a foundation of the gas turbine.

13. The gas turbine as claimed in claim 7, wherein the retainer furthermore comprises at least two lateral retainers which each support the at least one at least partially annular gas supply line on mutually opposite sides of the gas turbine.

14. The gas turbine as claimed in claim 13, wherein the at least two lateral retainers are not connected to the housing of the gas turbine.

15. The gas turbine as claimed in claim 14, wherein the at least two lateral retainers are supported in relation to the floor and are anchored in a foundation of the gas turbine.

16. The gas turbine as claimed in claim 13, wherein the at least two lateral retainers do not completely encompass the at least one at least partially annular gas supply line.

17. The gas turbine as claimed in claim 16, wherein the at least two lateral retainers support the at least one at least partially annular gas supply line in only two mutually opposite regions which are not interconnected.

18. The gas turbine as claimed in claim 13, wherein the at least two lateral retainers provide support only in relation to movement in the main flow direction.

19. The gas turbine as claimed in claim 7, wherein the at least one at least partially annular gas supply line comprises at least two at least partially annular gas supply lines.

20. The gas turbine as claimed in claim 19, wherein the at least two at least partially annular gas supply lines comprise two or four at least partially annular gas supply lines.

* * * * *